United States Patent
Nakamura

(10) Patent No.: US 8,438,518 B2
(45) Date of Patent: May 7, 2013

(54) APPARATUS FOR DESIGNING SEMICONDUCTOR INTEGRATED CIRCUIT, METHOD OF DESIGNING SEMICONDUCTOR INTEGRATED CIRCUIT, AND PROGRAM FOR DESIGNING SEMICONDUCTOR INTEGRATED CIRCUIT

(75) Inventor: Yuichi Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/254,300

(22) PCT Filed: Feb. 19, 2010

(86) PCT No.: PCT/JP2010/052508
§ 371 (c)(1),
(2), (4) Date: Sep. 1, 2011

(87) PCT Pub. No.: WO2010/101029
PCT Pub. Date: Sep. 10, 2010

(65) Prior Publication Data
US 2011/0320994 A1    Dec. 29, 2011

(30) Foreign Application Priority Data
Mar. 3, 2009    (JP) .................................. 2009-049916

(51) Int. Cl.
*G06F 17/50*    (2006.01)

(52) U.S. Cl.
USPC ............ 716/114; 716/113; 716/134; 716/108; 326/37; 326/38; 326/39; 326/47; 326/46

(58) Field of Classification Search ................... 716/113, 716/114, 108, 134; 326/37, 38, 39, 40, 41, 326/46, 47, 101
See application file for complete search history.

(56) References Cited

U.S. PATENT DOCUMENTS

| 5,764,528 | A | 6/1998 | Nakamura |
| 6,205,566 | B1 * | 3/2001 | Takeoka ........................ 714/726 |
| 2003/0061585 | A1 * | 3/2003 | Matsumoto ........................ 716/6 |
| 2007/0113213 | A1 * | 5/2007 | Watanabe et al. ............... 716/10 |

FOREIGN PATENT DOCUMENTS

| JP | 9-8143 A | 1/1997 |
| JP | 2677256 B2 | 7/1997 |
| JP | 2003-234643 A | 8/2003 |
| JP | 2004-186515 A | 7/2004 |

(Continued)

OTHER PUBLICATIONS

Circuits, Interconnections, and Packaging for VLSI, pp. 356-358, Maruzen Co., Ltd.

*Primary Examiner* — Vuthe Siek
*Assistant Examiner* — Brian Ngo
(74) *Attorney, Agent, or Firm* — Foley & Lardner LLP

(57) ABSTRACT

A device comprises a analysis section for detecting hold errors according to data including the values of the input and output nodes of the FF circuit, and identifying the node in which a hold error has occurred, a determining section for determining insertion of the trailing edge FF or the buffer into hold error sections on the basis of the results of the analysis by the analysis section, a FF insertion section for inserting the FF into a hold error section subjected to position determination so as to insert the trailing edge FF, and connecting a clock line to the FF based on the results of the determining section, and a buffer insertion section for inserting the buffer into the hold error section subjected to the position determination so as to insert the FF based on the results of data of the determining section.

5 Claims, 7 Drawing Sheets

FOREIGN PATENT DOCUMENTS

| | | |
|---|---|---|
| JP | 2005-26390 A | 1/2005 |
| JP | 2005-277909 A | 10/2005 |
| JP | 2007-142094 A | 6/2007 |
| JP | 2007-188517 A | 7/2007 |
| JP | 2008-217642 A | 9/2008 |

* cited by examiner

APPARATUS FOR DESIGNING SEMICONDUCTOR INTEGRATED CIRCUIT, METHOD OF DESIGNING SEMICONDUCTOR INTEGRATED CIRCUIT, AND PROGRAM FOR DESIGNING SEMICONDUCTOR INTEGRATED CIRCUIT

This application is the National Phase of PCT/JP2010/052508, filed Feb. 19, 2010, which claims priority to Japanese Application No. JP 2009-052508, filed Mar. 3, 2009, the disclosures of which are hereby incorporated by reference in their entirety.

TECHNICAL FIELD

The present invention relates to technologies for semiconductor integrated circuit design.

BACKGROUND ART

Synchronous semiconductor integrated circuits are generally realized in such a manner that a flip-flop circuit in a circuit is synchronized to a clock. In the synchronous semiconductor integrated circuits, the maximum value of a delay in propagation time between flip-flop circuits in a circuit determines the frequency of the clock to which the flip-flop circuits are synchronized. It is not true that a shorter delay in propagation between flip-flop circuits is always preferable. That is, because of a period of time after which the flip-flop circuit will be able to read data, or a time difference of a clock supplied to two flip-flop circuits connected by a propagating signal, a delay in propagation of a certain time (a period of time equal to or longer than a certain time) is required to be defined between individual flip-flop circuits. For example, without such a delay of a certain time between flip-flop circuits connected by a propagating signal, a previous clock signal is picked up by the flip-flop circuit as data. This results in a failure. Such a failure is referred to as a hold error. Techniques for preventing the hold error have been proposed (PTLs 1-8, and NPL 1).

A system for designing a semiconductor integrated circuit in NPL 1 comprises semiconductor integrated circuit data, a circuit delay measurement system, a delay buffer insertion deciding system, and a delay buffer inserting system. In this system, the circuit delay measurement system first measures a delay in a pair of flip-flop circuits between which a signal propagates. Next, the delay buffer insertion deciding system decides where a hold error is likely to occur using a result of the measurement. The delay buffer inserting system then inserts a delay buffer for generating a delay to prevent occurrence of a hold error. For example, in a case that two flip-flop circuits are directly connected with each other without any circuit element for generating a delay and a hold error is expected to occur, a delay gate is inserted by this system for designing a semiconductor integrated circuit. This eliminates a hold error (see FIG. 9).

A system for designing a semiconductor integrated circuit as disclosed in PTL 1 comprises semiconductor integrated circuit data, a circuit delay measurement system, a latch circuit insertion deciding system, and a latch circuit inserting system. In this system, the circuit delay measurement system first measures a delay in a pair of flip-flop circuits between which a signal propagates. Next, the latch circuit insertion deciding system decides where a hold error is likely to occur using a result of the measurement. Then, the latch circuit inserting system inserts a latch circuit that blocks signal transmission in a half of a clock cycle and permits signal transmission in the other half of a clock cycle. As a result, a delay equivalent to a half of a clock cycle is given to a signal line with a hold error. For example, in a case that two flip-flop circuits are directly connected with each other without any circuit element for generating a delay and a hold error is expected to occur, a latch circuit is inserted by this semiconductor integrated circuit design system. Thus, a delay equivalent to a half of a clock cycle is inserted. This eliminates a hold error (see FIGS. 9, 10).

In PTL 2, a design technique using a latch circuit is proposed. However, the technique is extremely difficult to adapt to a design technique applied to common flip-flop-based synchronization circuits.

According to PTL 3, there is a description as "If a flip-flop circuit under any of these conditions can be divided into latch circuits, the division is determined according to conditions such as a delay time in a preceding path and a delay in a subsequent path." There is also a description as "the clock cycle period is set longer by a predetermined value and the logic circuits are arranged, and the flip-flop circuits related to an error path on which an error for the target clock cycle occurs are replaced by latch circuits to rearrange the logic circuits in the pipeline design using flip-flop circuits. It is, therefore, possible to increase the permissible maximum logic delay time of a logic path and to easily design a pipeline."

According to PTL 4, there is a description as "a signal line connecting system in accordance with this embodiment is comprised of: a logic design data memory section for storing therein logic design data for a semiconductor device; a program storage section for storing therein programs or the like for analyzing timing of signal lines to create a new via connection pattern; a position/connection information memory section for storing therein information about the position and connection of logic elements; a timing information memory section for storing therein timing analysis information for a signal delay in propagation time in a signal line; a via information memory section for storing therein via information for a signal line formed in a different redistribution layer and connected through a via; a processing control section comprising means for executing a series of signal line connecting processing; an output device for outputting a result of the processing via an input/output control section; and an input device for inputting a command and the like to the processing control section." There is also a description as "There are provided signal line connecting method and system in which a signal delay in propagation time sufficient for controlling timing between logic elements is given."

According to PTL 5, there is a description as "for hierarchical design, comprising: a plurality of timing distribution production sections individually provided corresponding to a plurality of design hierarchical layers, and each of which receives block information regarding a function of a circuit from a respective timing information database having netlist information regarding a wiring line scheme and outputs a respective timing distribution value obtained by distributing a delay value produced by a delay element of the circuit; and an inter-hierarchical layer association manager for dynamically changing connections between said plurality of timing distribution production sections and transmitting and receiving modification information regarding the respective timing distribution value to and from said plurality of timing distribution production sections." There is also a description as "when the timing specifications are changed, a range of the influence of the change can be referred to immediately, and consequently, a reference mistake upon such change of the specifications is eliminated. Further, the combination of provisional wiring and actual wiring can achieve both of augmentation of an execution speed of floor planning and augmentation of an accuracy. Furthermore, a hierarchical entity can be used and a distributed design environment can be constructed. Further, in top-down design, only a necessary portion can be particularized, and it can be examined whether timing specifications divided by trial and examination are appropriate or not by one design team. Consequently, problems upon implementing can be estimated and otherwise possible iterations can be reduced."

According to PTL 6, there is a description as "In the delay optimization unit, there is the step of inserting a level latch circuit in a signal path violating said minimum delay constraints, wherein the step of inserting comprises the steps of: calculating the frequency of overlap of each output terminal included in said synchronous sequential circuit with signal paths violating the minimum delay constraints; and inserting said level latch circuit in a signal path in the descending order of said frequency of overlap such that an LSI layout pattern area of said synchronous sequential circuit is minimized." There is also a description as "the calculation processing time can be reduced because the maximum delay time is not affected. Moreover, the increase in the LSI layout pattern area in the synchronous sequential circuit can be reduced."

According to PTL 7, there are a description as "a method for designing a semiconductor integrated circuit using pattern data for a flip flop function device including a flip flop forming means for receiving a clock signal and a data signal, a latch forming means for receiving the clock signal and an output signal of the flip flop forming means, a first output terminal for outputting a signal from the flip flop forming means, and a second output terminal for outputting a signal from the latch forming means, the method characterized in including the steps of designing a circuit by forming a data path with the first output terminal; inspecting hold time in a latter stage device of the data path; and connecting the latter stage device to the second output terminal instead of the first output terminal when found in the inspection that there is a possibility of occurrence of a hold time violation," and a description as "an apparatus for designing a semiconductor integrated circuit using pattern data for a flip flop function device including a flip flop forming means for receiving a clock signal and a data signal, a latch forming means for receiving the clock signal and an output signal of the flip flop forming means, a first output terminal for outputting a signal from the flip flop forming means, a second output terminal for outputting a signal from the latch forming means, the apparatus characterized in including: a design processing means for designing a circuit by forming a data path with the first output terminal; a hold time inspecting means for inspecting hold time in a latter stage device of the data path; and a data path correcting means for connecting the latter stage device to the second output terminal instead of the first output terminal when found in the inspection that there is a possibility of occurrence of a hold time violation."

According to PTL 8, an object is "to provide a method of designing layout of a semiconductor integrated circuit in which, in a case that there is no space in a hold error path for disposing a buffer for eliminating a hold error or in a case that there is space for disposing the buffer but a setup error is introduced, a point for inserting a buffer preventing a new delay error can be searched for by moving other cells, duplicating a line or modifying line connection, thereby avoiding repetition of ECO layout", and there is a description as "a method of designing layout of a semiconductor integrated circuit, the method characterized in comprising the steps of performing initial positioning/connection by initial positioning/connecting means based on a netlist for a semiconductor integrated circuit to create layout information; performing extraction of line resistance and line capacity, delay calculation, and static timing analysis by RC extraction/delay calculation/static timing analysis means based on said layout information to create line resistance/line capacity information and hold error path/slack information; making a decision about the presence/absence of a hold error by hold error presence/absence deciding means based on said hold error path/slack information, and in a case that a hold error is present, creating information on a penalty required to search for a point for inserting a buffer for eliminating a hold error by penalty information creating means based on said layout information and said hold error path/slack information; and performing search for and determination of said insertion point and delay coordination by buffer insertion point searching/determining/delay coordinating means based on said penalty information." However, no description of a flip-flop circuit is found in PTL 8.

[Citation List]
  [Patent Literature]
  PTL 1: JP-P2677256B
  PTL 2: JP-P2005-277909A
  PTL 3: JP-P2003-234643A
  PTL 4: JP-P2005-26390A
  PTL 5: JP-P2007-188517A
  PTL 6: JP-P1997-008143A
  PTL 7: JP-P2007-142094A
  PTL 8: JP-P2008-217642A
  [Non Patent Literature]
  NPL 1: "Circuits, Interconnections, and Packaging for VLSI," edited and translated by Kisaburou NAKAZAWA and Hiroshi NAKAMURA, published by MARUZEN Co., Ltd., pp. 356-358

SUMMARY OF INVENTION

Technical Problem

PTLs 1-8 and NPL 1 above do not propose concrete techniques for solving the following two problems.

The first problem is that a design technique for eliminating a hold error by inserting a delay gate in a semiconductor integrated circuit experiencing a hold error causes a significant increase of the area. A delay gate for intentionally generating a delay is fabricated by stacking common gate circuit elements in order to intentionally generate a delay. This requires a large area. It is expected that this trend will be accelerated in the super submicron process in the future. Even at a current process level, the circuit area is roughly doubled to eliminate a hold error. Especially for two directly connected flip-flops, to eliminate a hold error having a comparatively great value, it is necessary to generate a large number of delays (that is, to insert a gate requiring a large area). When transistors are sped up by a submicron process in the future, a delay gate having a still larger area must be inserted.

Techniques involving inserting a latch in a semiconductor integrated circuit (see PTLs above) may often eliminate a hold error between two flip-flops. However, the techniques involving inserting a latch give rise to a second problem. Specifically, in a case that a clock supplied to the inserted latch circuit is not properly timed per se, a delay value cannot be inserted at a proper time. It is also difficult to control clock timing for the inserted latch.

Accordingly, a problem to be solved by the present invention is to provide a design apparatus (design system) for a semiconductor integrated circuit that causes a reduced increase of the area required to eliminate a hold error and can be easily controlled for a signal propagating between flip-flop circuits in a case that a comparatively great delay value should be inserted or in a case that an error (setup error) due to too great a delay value should be prevented after inserting a comparatively great delay.

Solution to Problem

The aforementioned problem is solved by:

an apparatus for designing a semiconductor integrated circuit including flip-flop circuits, said apparatus characterized in comprising:

a timing analyzing section for detecting a hold error according to timing analysis data including values at input and output nodes of said flip-flop circuits, and identifying a node experiencing said hold error;

a fall FF/buffer insertion determining section for determining insertion of a fall FF or a buffer in said hold error position based on a result of the analysis by said timing analyzing section;

a fall FF inserting section for inserting a fall FF in said hold error position located to insert a fall FF based on fall FF insertion position data from said fall FF/buffer insertion determining section, and connecting a clock line to said inserted fall FF; and a buffer inserting section for inserting a buffer in said hold error position located to insert a buffer based on buffer insertion position data from said fall FF/buffer insertion determining section.

The aforementioned problem is solved by:

a method of designing a semiconductor integrated circuit including flip-flop circuits in which a hold error is remedied, said method characterized in comprising:

an analyzing step at which a timing analyzing section detects a hold error based on semiconductor integrated circuit design data and identifies a node experiencing said hold error;

a fall FF/buffer insertion determining step at which a fall FF/buffer insertion determining section determines insertion of a fall FF or a buffer in said hold error position based on a result of the analysis by said timing analyzing step;

a fall FF inserting step at which a fall FF inserting section inserts a fall FF in said hold error position located to insert a fall FF based on fall FF insertion position data from said fall FP/buffer insertion determining step, and connects a clock line to said inserted fall FF; and a buffer inserting step at which a buffer inserting section inserts a buffer in said hold error position located to insert a buffer based on buffer insertion position data from said fall FF/buffer insertion determining step.

The aforementioned problem is solved by:

a program causing a computer to design a semiconductor integrated circuit including flip-flop circuits, said program characterized in causing said computer to function as:

a timing analyzing section for detecting a hold error according to timing analysis data including values at input and output nodes of said flip-flop circuits, and identifying a node experiencing said hold error;

a fall FF/buffer insertion determining section for determining insertion of a fall FF or a buffer in said hold error position based on a result of the analysis by said timing analyzing section;

a fall FF inserting section for inserting a fall. FF in said hold error position located to insert a fall FF based on fall FF insertion position data from said fall FF/buffer insertion determining section, and connecting a clock line to said inserted fall FF; and a buffer inserting section for inserting a buffer in said hold error position located to insert a buffer based on buffer insertion position data from said fall FF/buffer insertion determining section.

Advantageous Effects of Invention

For a signal propagating between flip-flop circuits, a hold error that occurs in a signal line having a delay value smaller than an individually set delay value is eliminated. An increase of the area required for the elimination of a hold error is small. In inserting a great delay, the arrival time of a clock signal at the inserted element can be easily controlled.

DESCRIPTION OF EMBODIMENTS

Figure 1:
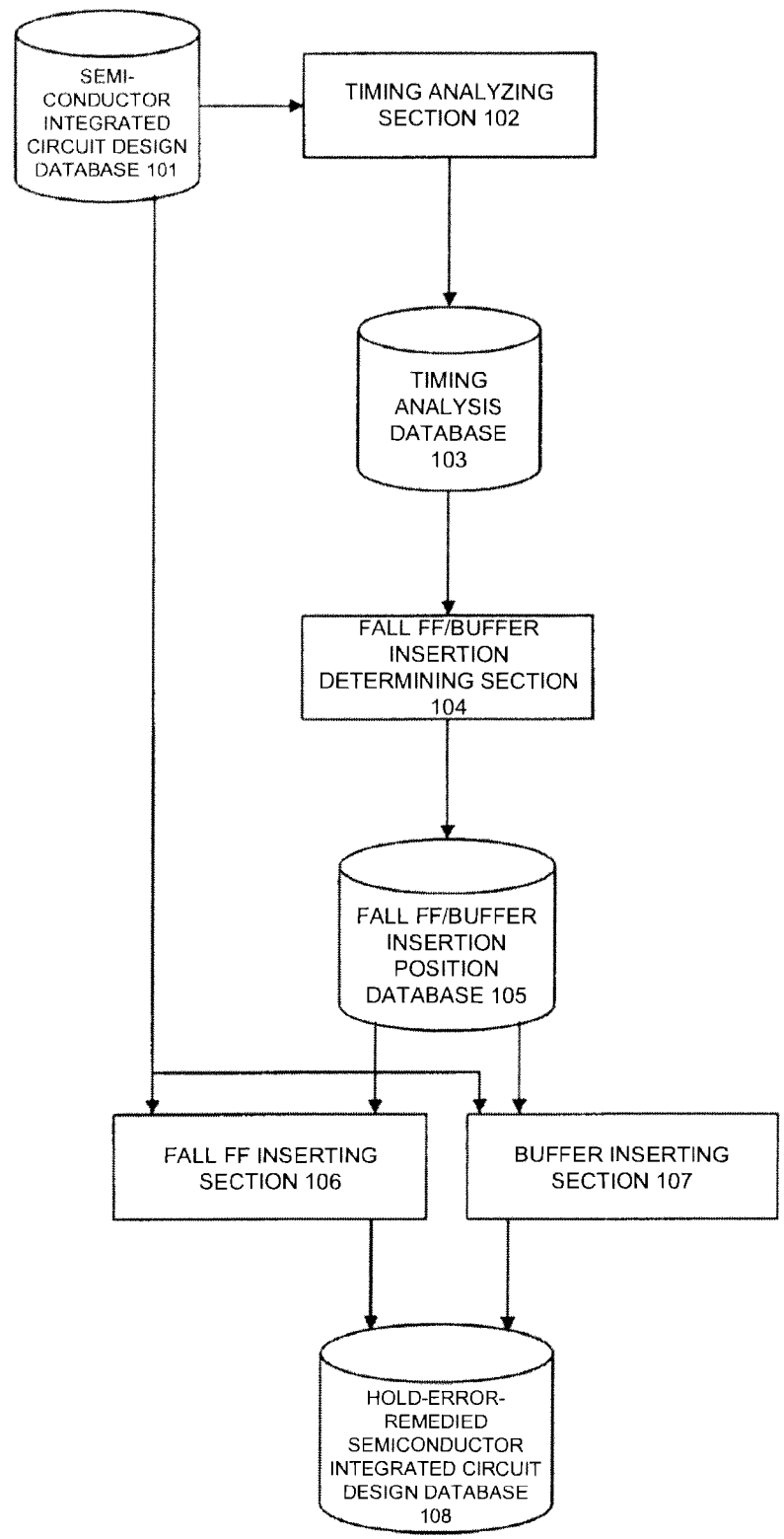
[FIG. 1] A schematic diagram of a semiconductor integrated circuit design apparatus of one embodiment in accordance with the present invention.

An apparatus for designing a semiconductor integrated circuit in accordance with the present invention is an apparatus for designing a semiconductor integrated circuit including flip-flop circuits. The aforementioned apparatus has a timing analyzing section. The aforementioned timing analyzing section detects a hold error according to timing analysis data including values at input and output nodes of the aforementioned flip-flop circuits, and identifies a node experiencing the aforementioned hold error. The aforementioned timing analyzing section preferably detects a hold error according to timing analysis data including values at input and output nodes of the aforementioned flip-flop circuits and the arrival time of a clock supplied to the aforementioned flip-flops, and identifies a node between flip-flops experiencing the aforementioned hold error. The aforementioned timing analyzing section preferably detects a hold error based on semiconductor integrated circuit design data, and identifies a node experiencing the aforementioned hold error. The aforementioned apparatus has a fall FF/buffer insertion determining section. The aforementioned fall FF/buffer insertion determining section determines insertion of a fall FF or a buffer in the hold error position based on a result of the analysis by the aforementioned timing analyzing section. The aforementioned fall FF/buffer insertion determining section preferably determines which of a fall FF or a buffer to insert based on whether all hold error positions cause a setup error after inserting a delay equivalent to a half of a clock cycle. The aforementioned apparatus has a fall FF inserting section. The aforementioned fall FF inserting section inserts a fall FF at the aforementioned hold error position located to insert a fall FF based on fall FF insertion position data from the aforementioned fall FF/buffer insertion determining section, and connects a clock line to the inserted fall FF. The aforementioned fall FF inserting section preferably inserts a fall FF in the aforementioned hold error position based on the aforementioned semiconductor integrated circuit design data and the fall FF insertion position data from the aforementioned fall FF/buffer insertion determining section, and connects a clock line to the inserted fall FF. The aforementioned apparatus has a buffer inserting section. The aforementioned buffer inserting section inserts a buffer in the aforementioned hold error position located to insert a buffer based on buffer insertion position data from the aforementioned fall FF/buffer insertion determining section. The aforementioned buffer inserting section preferably inserts a buffer in the aforementioned hold error position based on the aforementioned semiconductor integrated circuit design data and the buffer insertion position data from the aforementioned fall FF/buffer insertion determining section. The aforementioned apparatus preferably further has a database in which the semiconductor integrated circuit design data is stored.

A method of designing a semiconductor integrated circuit in accordance with the present invention is a method of designing a semiconductor integrated circuit including flip-flop circuits in which a hold error is remedied. The aforementioned method has an analysis step. The aforementioned analysis step is a step by a timing analyzing section for detecting a hold error based on semiconductor integrated circuit design data and identifying a node experiencing the aforementioned hold error. The aforementioned analysis step is preferably a step by a timing analyzing section for detecting a hold error according to timing analysis data including values at input and output nodes of the aforementioned flip-flop circuits and the arrival time of a clock supplied to the flip-flops, and identifying a node between flip-flops experiencing the aforementioned hold error. The aforementioned method has a fall FF/buffer insertion determining step. The aforementioned fall FF/buffer insertion determining step is a step by a fall FF/buffer insertion determining section for determining insertion of a fall FF or a buffer in the aforementioned hold error position based on a result of the analysis by the aforementioned analyzing step. The aforementioned method has a fall FF insertion step. The aforementioned fall FF insertion step is a step by a fall FF inserting section for inserting a fall FF in the aforementioned hold error position located to insert a fall FF based on fall FF insertion position data from the aforementioned fall FF/buffer insertion determining step, and connecting a clock line to the inserted fall FF. The aforementioned method has a buffer insertion step. The aforementioned buffer insertion step is a step by a buffer inserting section for inserting a buffer in the aforementioned hold error position located to insert a buffer based on buffer insertion position data from the aforementioned fall FF/buffer insertion determining step. The aforementioned method is preferably a method performed by the apparatus for designing a semiconductor integrated circuit of the aforementioned present invention.

A program for designing a semiconductor integrated circuit in accordance with the present invention is a program causing a computer to design a semiconductor integrated circuit including flip-flop circuits. This program is a program causing the computer to function as the aforementioned timing analyzing section, the aforementioned fall FF/buffer insertion determining section, the aforementioned fall FF inserting section, and the aforementioned buffer inserting section. Alternatively, it is a program causing the computer to perform the aforementioned method. The program is written into a storage medium.

The present invention effects a significant advantage in eliminating a hold error. For example, an increase of the area required for the elimination of a hold error is small. In inserting a great delay, the arrival time of a clock signal at the inserted element can be easily controlled.

For example, as compared with the delay gate insertion method or latch circuit insertion method that merely inserts a circuit element, the present invention in which a fall flip-flop is inserted can achieve a comparatively great delay, such as a half of a clock cycle, with a smaller area, such as a single flip-flop. Especially in a case that a delay gate is employed to control a timing inconsistency problem caused by line connection with increasing capacity by miniaturization in the future and caused by circuit elements with an improved operation speed by miniaturization, several tens of buffers are required in inserting a delay of the order of a half of a clock cycle. In view of the fact, the technique of the present invention can address the problem with a very small area. Because of such a small area, power consumption can be reduced.

The present invention inserts a flip-flop for latching fall data. Therefore, it is unnecessary to adjust a lag in the arrival time of a clock at the inserted element itself. Specifically, a fall of the clock occurs in a half of a clock cycle. Thus, even in a case that the arrival time of the clock fall is somewhat shifted, a delay of a half of a cycle of the clock can be accurately given to a position for insertion. As compared with a theoretically ideal condition without any shift, collapse due to a shift caused by latch insertion is prevented unless a premature arrival time of the clock by a time greater than a half of a clock cycle is encountered.

Since a flip-flop for latching fall data is inserted, it is unnecessary to take account of testing for extracting non-defective parts regarding the fall flip-flop to be inserted. For example, the fall flip-flop is used only for the purpose of inserting a delay. Thus, it is unnecessary to perform a test with a value supplied from the external by a scan.

Now the present invention will be described in more detail.

It should be noted that the present invention is not limited to the embodiment below, and it may be modified as appropriate within a scope of the technical concept of the present invention.

[First Embodiment]

FIG. 1 is a schematic diagram of a semiconductor integrated circuit design apparatus of one embodiment in accordance with the present invention.

An apparatus for designing a semiconductor integrated circuit (a design aid system for a semiconductor integrated circuit) of this embodiment has a function block 102, a function block 104, a function block 106, and a function block 107. It also has databases (memories) 101, 103, 105 and 108 associated with the function blocks 102, 104, 106 and 107.

The function block 102 is a timing analyzing section. The function block 104 is a fall FF/buffer insertion determining section. The function block 106 is a fall FF inserting section. The function block 107 is a buffer inserting section.

The database 101 is a semiconductor integrated circuit design database. Data stored in the database 101 are those to be output to the timing analyzing section 102, the fall FF inserting section 106, and the buffer inserting section 107. The database 103 is a timing analysis database. Data stored in the database 103 are those output by the timing analyzing section 102. Data stored in the database 103 are those to be output to the fall FF/buffer insertion determining section 104. The database 105 is a fall FF/buffer insertion position database. Data stored in the database 105 are those output by the fall FF/buffer insertion determining section 104. Data stored in the database 105 are those to be output to the fall FF inserting section 106 (or the buffer inserting section 107). The database 108 is a hold-error-remedied semiconductor integrated circuit design database. Data stored in the database 108 is a result output from the function blocks 106 and 107. The data is also hold-error-remedied semiconductor integrated circuit design data.

In general, these function blocks each operate as follows:

The timing analyzing section 102 determines a delay in propagation in circuit elements in a semiconductor integrated circuit and a delay in propagation between flip-flop circuits. Particularly, the following timing analysis technique is employed: A delay between adjacent circuit element gates and a delay in a line are each calculated. The calculated values are used to analyze a delay value between the circuit element gates, a delay value for propagation in a connection between connected flip-flop circuits, and a difference in arrival time of a clock at the flip-flops. Then, a delay position and a delay value in the circuit arrangement are identified on a gate or circuit block level, and are output as timing analysis data. The timing analysis data are stored in the timing analysis database (memory) 103. The timing analysis techniques that can be employed include element-level simulation, delayed gate level simulation, and post layout simulation. In particular, Primetime (trademark), TimeMill (trademark), or SPICE (trademark) available from Synopsys (U.S.) are employed.

The fall FF/buffer insertion determining section 104 determines a line between two flip-flops in which a fall FF can be inserted based on the data from the timing analysis database 103. Specifically, all hold errors are detected from the timing analysis database 103. For such a hold error, a decision is made as to whether a setup error occurs after inserting a delay of the order of a half of a clock cycle. In a case that a setup error does not occur, it is decided to insert a fall FF. In a case that a setup error occurs, it is decided to insert a buffer. The fall FF/buffer insertion determining section 104 outputs the decision to the fall FF/buffer insertion position database 105. This decision is about which of a fall FF or a buffer to insert for each hold error.

The fall FF inserting section 106 inserts a fall FF at a position of the hold error at which it is decided to insert a fall FF based on the data from the semiconductor integrated circuit design database 101 and the data from the fall FF/buffer insertion position database 105. The processing is simplified when the position for insertion is determined as a point before a flip-flop on the output side. However, insertion may be made at any position. Insertion may be made at any position on the output side. The same clock signal as that for the flip-flops on both ends is connected to a clock input of the flip-flop. The result is output to the hold-error-remedied semiconductor integrated circuit design database 108.

The buffer inserting section 107 inserts a buffer at a position of the hold error at which it is decided to insert a buffer based on the data from the semiconductor integrated circuit design database 101 and the data from the fall FF/buffer insertion position database 105. The processing is simplified when the position for insertion is determined as a point before a flip-flop on the output side. However, insertion may be made at any position. For example, insertion may be made at any position on the output side. This inserted buffer is a buffer with which a hold error can be eliminated (or a number of buffers required to eliminate a hold error). The result is output to the hold-error-remedied semiconductor integrated circuit design database 108.

Each database is generally constructed as follows:

The semiconductor integrated circuit design database 101 stores therein a gate-level netlist for designing/manufacturing a semiconductor integrated circuit, an HDL, and library data including delay data and process data. It also stores therein a single chip or core level data. Further, it also stores therein simulatable data (such as, for example, delay information taking account of line connection including the line length and line capacity etc. extracted from layout data). That is, data required in designing/manufacturing a semiconductor integrated circuit are stored.

The timing analysis database 103 stores therein resulting data from timing analysis by the timing analyzing section 102. For example, input signals for testing and electric potential displacement information along a time axis of each node are stored.

The fall FF/buffer insertion position database 105 stores therein data of all hold errors. It also stores therein data as to which of a fall FF or a buffer to insert for a hold error. Such data are those determined by the fall FF/buffer insertion determining section 104.

The hold-error-remedied semiconductor integrated circuit design database 108 stores therein data for semiconductor integrated circuit design. The data is hold-error-remedied semiconductor integrated circuit design data by the fall FF inserting section 106 (or the buffer inserting section 107).

Figure 2:
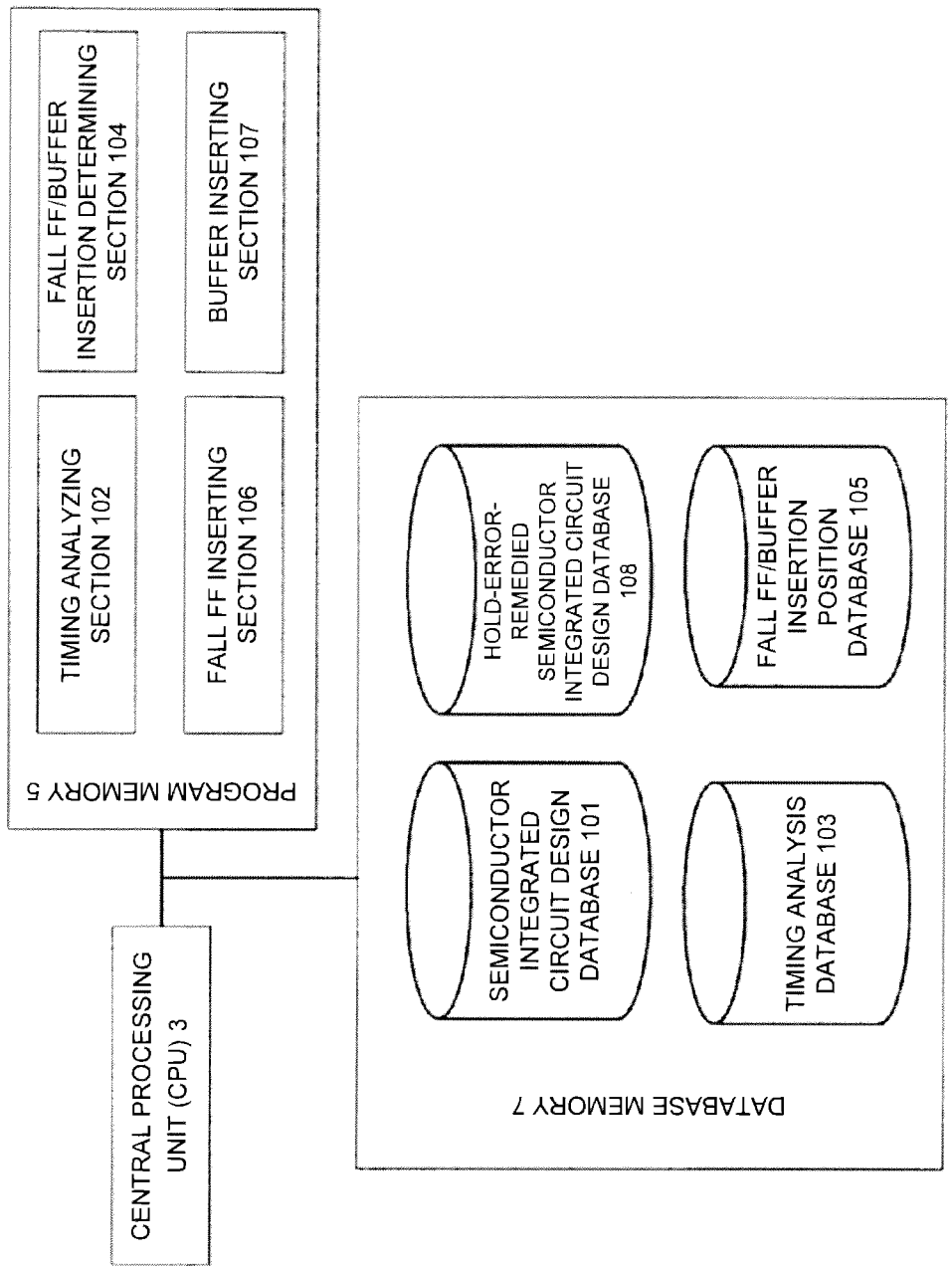
[FIG. 2] A schematic diagram of the semiconductor integrated circuit design apparatus in FIG. 1 implemented by a computer.
Figure 3:
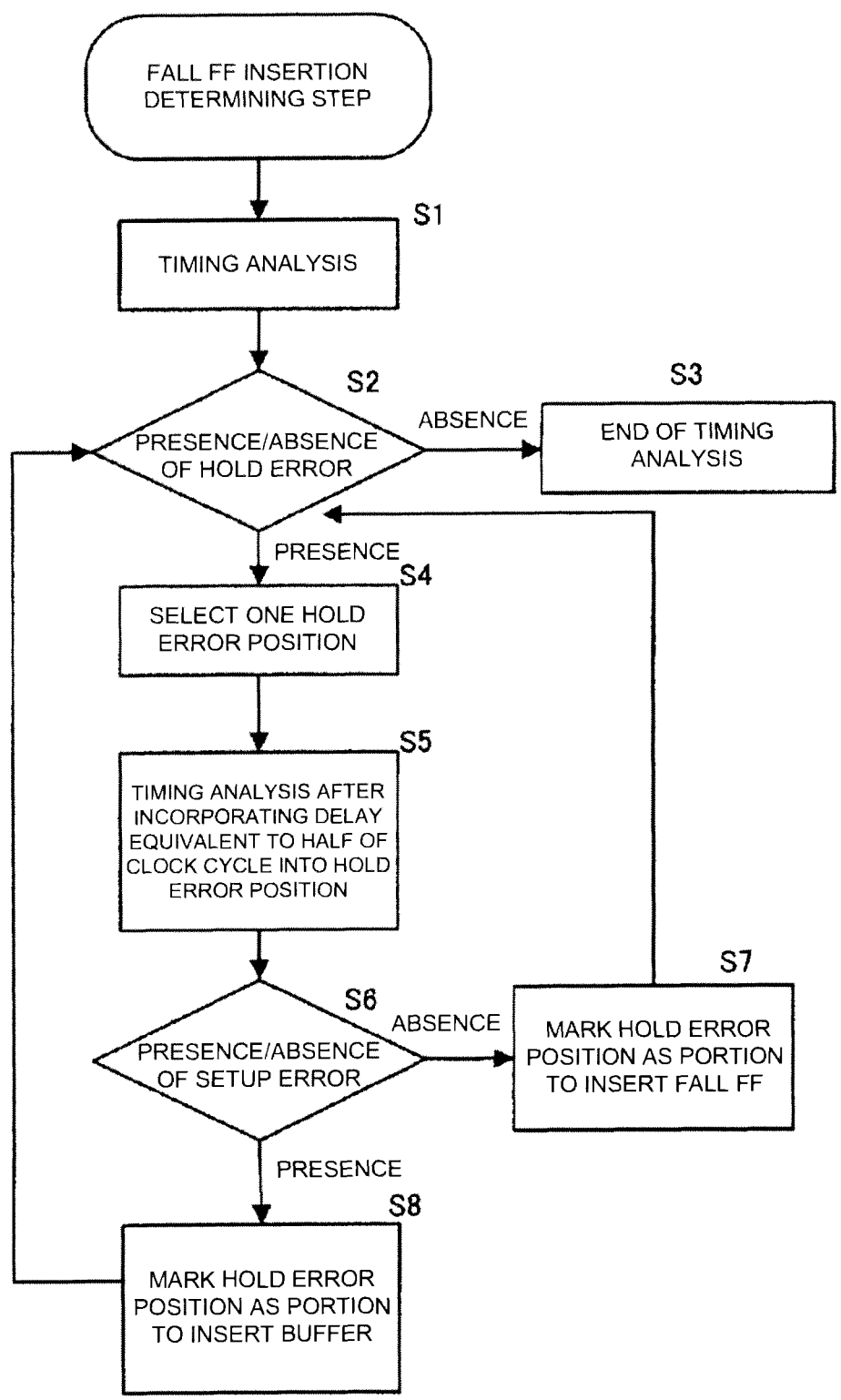
[FIG. 3] A flow chart of a semiconductor integrated circuit design method of one embodiment in accordance with the present invention.

A block diagram of the present invention configured in a central processing unit (computer) is shown in FIG. 2.

The apparatus for designing a semiconductor integrated circuit (the design aid system for a semiconductor integrated circuit) of the present invention has a central processing unit (CPU) 3, a program memory 5, and a database memory 7. The program memory 5 stores therein the timing analyzing section 102, the fall FF/buffer insertion determining section 104, the fall FF inserting section 106, and the buffer inserting section 107. These function blocks 102, 104, 106 and 107 may be stored in the program memory 5 and may be run in cooperation with the central processing unit 3, or they may be transferred to another memory device to be run. The database memory 7 stores therein the semiconductor integrated circuit design database 101, the timing analysis database 103, the fall FF/buffer insertion position database 105, and the hold-error-remedied semiconductor integrated circuit design database 108. Memories for use as the program memory 5 and the database memory 7 may be any one of magnetic memories, semiconductor memories or memories by other techniques.

The central processing unit (CPU) 3 runs the computer program (software) loaded from the program memory 5. This causes the apparatus for designing a semiconductor integrated circuit in FIG. 2 to achieve functions of the function blocks in FIG. 1.

Next, an operation of the apparatus for designing a semiconductor integrated circuit in FIGS. 1 and 2 will be described (see FIGS. 3-8).

First, the timing analyzing section 102 makes a request for data necessary to the semiconductor integrated circuit design database 101. The semiconductor integrated circuit design database 101 stores therein design data for use in designing a semiconductor integrated circuit (before manufacturing the semiconductor integrated circuit). Based on the data obtained from the semiconductor integrated circuit design database 101, the timing analyzing section 102 uses an appropriate test pattern to calculate a delay in propagation between logic element gates and a delay in propagation between flip-flop circuits as timing analysis data (S1).

The timing analyzing section 102 decides the presence/absence of occurrence of a hold error from the calculated delays in propagation between logic element gates and between flip-flop circuits (S2 (see FIG. 3)).

In a case that no hold error occurs, the timing analyzing section 102 terminates the timing analysis (S3).

In a case that a hold error occurs, the fall FF/buffer insertion determining section 104 uses a result of the timing analysis in which delay-in-propagation information is stored in the timing analysis database 103, to measure timing for each hold error occurring position after inserting a delay equivalent to a half of a clock cycle in the hold error position. Then, a decision is made as to whether a setup error occurs (S4, S5, S6).

In a case that no setup error occurs, a fall FF is inserted in the hold error position (S7). Then, the presence/absence of a hold error is checked (S2). Depending upon the presence/absence of the error, the process goes to Step S3 or S4 described above.

In a case that a setup error occurs, a buffer is inserted in the hold error position (S8). Then, the presence/absence of a hold error is checked (S2). Depending upon the presence/absence of the error, the process goes to Step S3 or S4 described above.

Figure 4:
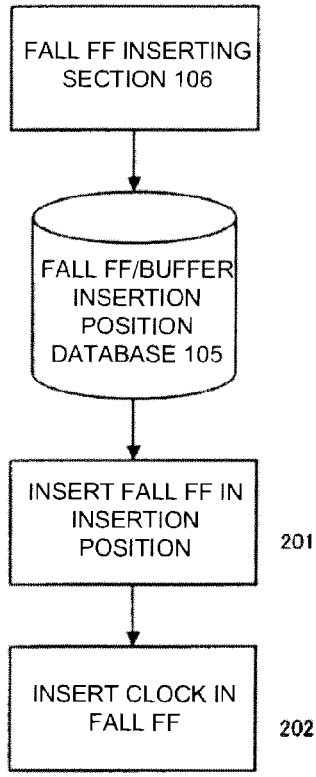
[FIG. 4] A flow chart for a fall FF inserting section.

As remedies against each hold error stored in the fall FF/buffer insertion position database 105, the fall FF inserting section 106 inserts a fall FF in a line experiencing a hold error for which a fall FF is to be inserted, and supplies the same clock as that for the flip-flops on both ends (see FIG. 4).

Figure 5:
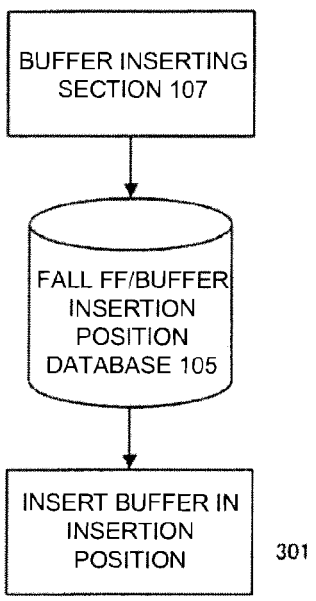
[FIG. 5] A flow chart for a buffer inserting section.

As remedies against each hold error stored in the fall FF/buffer insertion position database 105, the buffer inserting section 107 inserts a buffer in a line experiencing a hold error for which a buffer for eliminating the hold error is to be inserted (see FIG. 5).

As a result, a hold error having a great value is eliminated.

Figure 9:
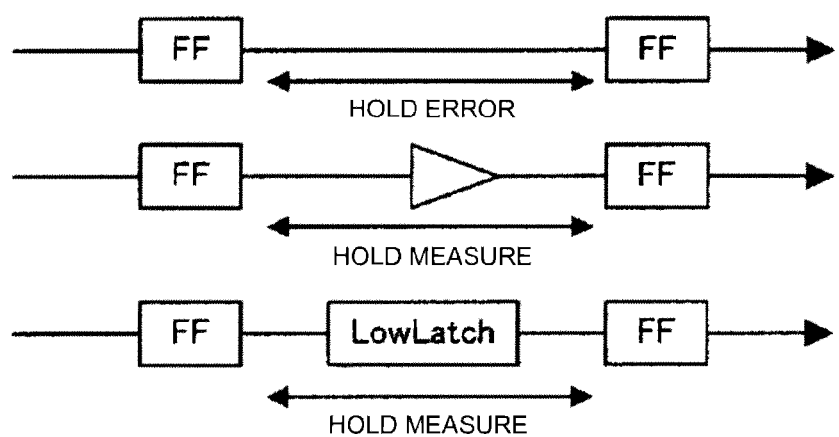
[FIG. 9] An explanatory diagram for conventional remedies against a hold error.

FIG. 9 shows an exemplary hold error and a conventional remedial technique for amending the hold error. Too small a signal propagation value between the flip-flops, in which the arrival times of the clock at the flip-flops on both sides are taken into account, causes a hold error. For this problem, there are known methods of blocking a signal over a half of a cycle using the techniques as proposed in the aforementioned prior art literature, "buffer insertion" and "latch insertion."

Figure 10:
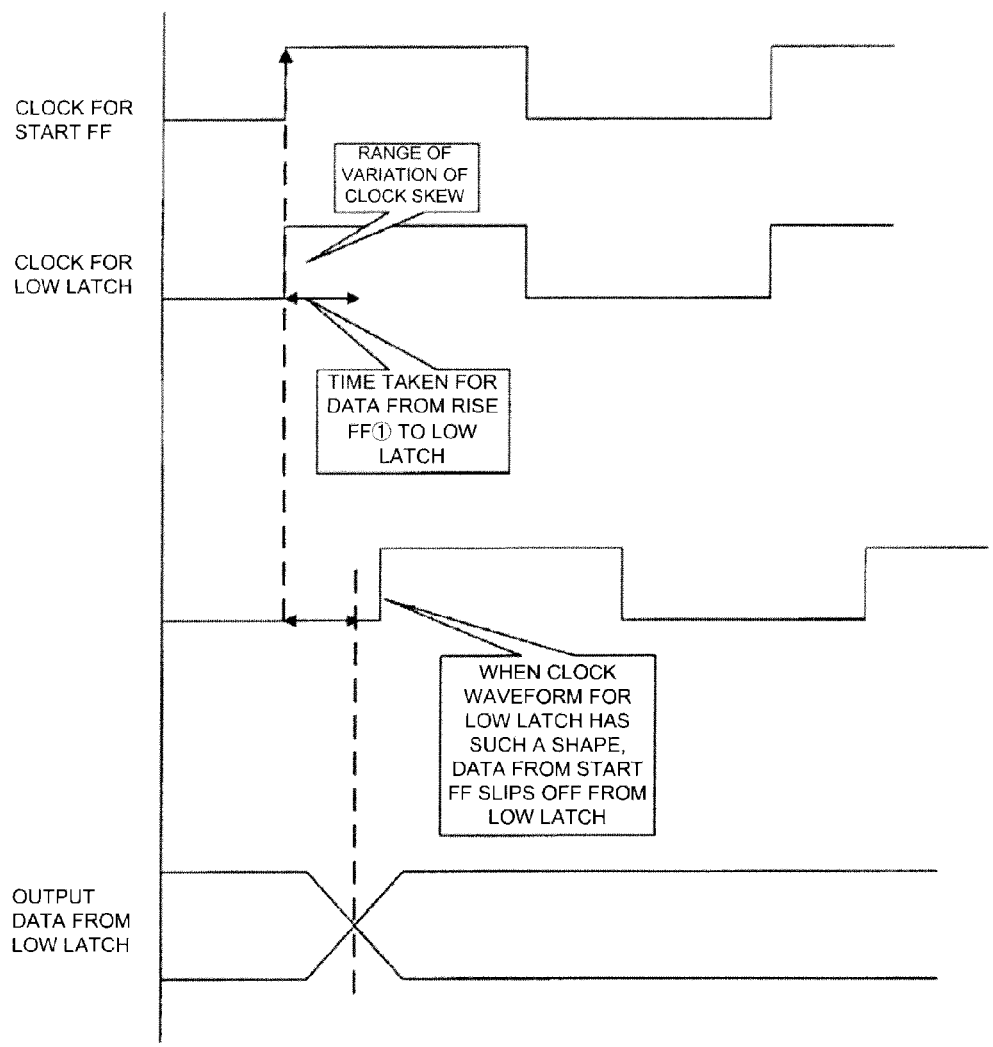
[FIG. 10] A timing chart for conventional remedies against a hold error (as by inserting a latch).

The "buffer insertion" technique in the prior art literature, however, requires a large number of buffers to be inserted for a hold error with a comparatively great value due to enhancement in speed of semiconductors. The "latch insertion" technique in the prior art literature requires a clock to be rigorously supplied to a latch to be inserted (see FIG. 10). For a clock waveform shown in FIG. 10, data slips off. As a result, remedies against a hold error cannot be applied.

Figure 6:
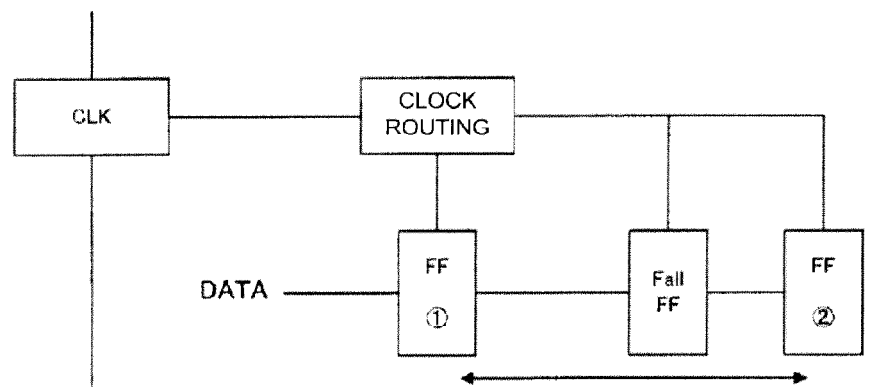
[FIG. 6] An explanatory diagram representing an example of fall FF insertion.
Figure 7:
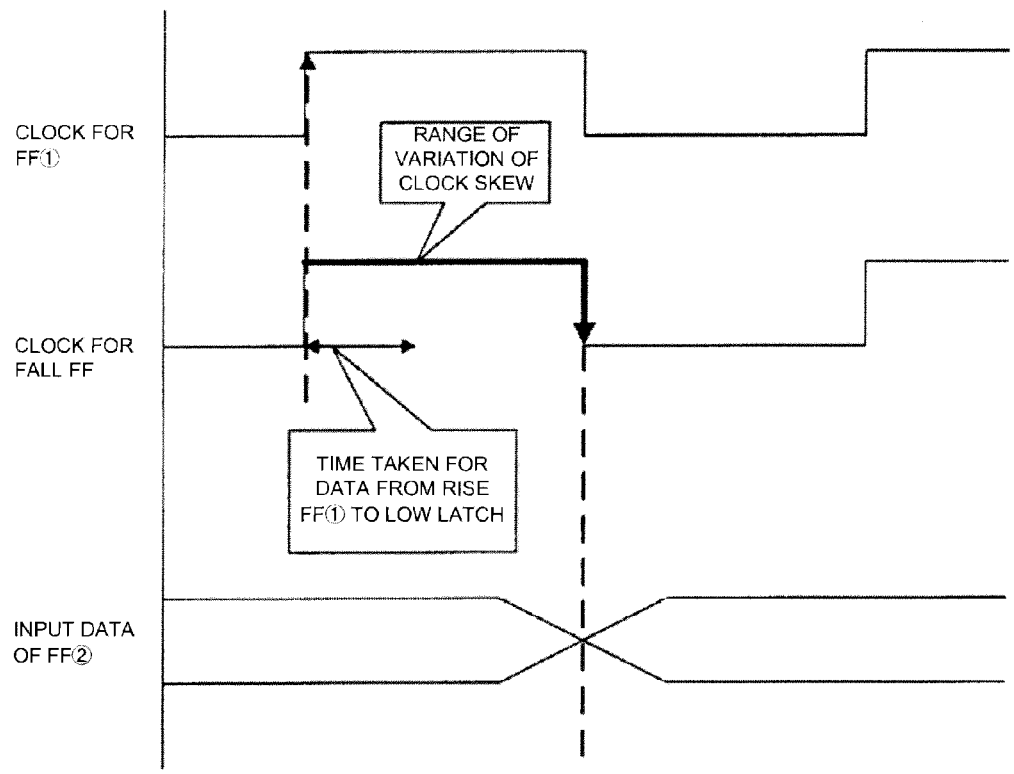
[FIG. 7] A timing chart for fall FF insertion.
Figure 8:
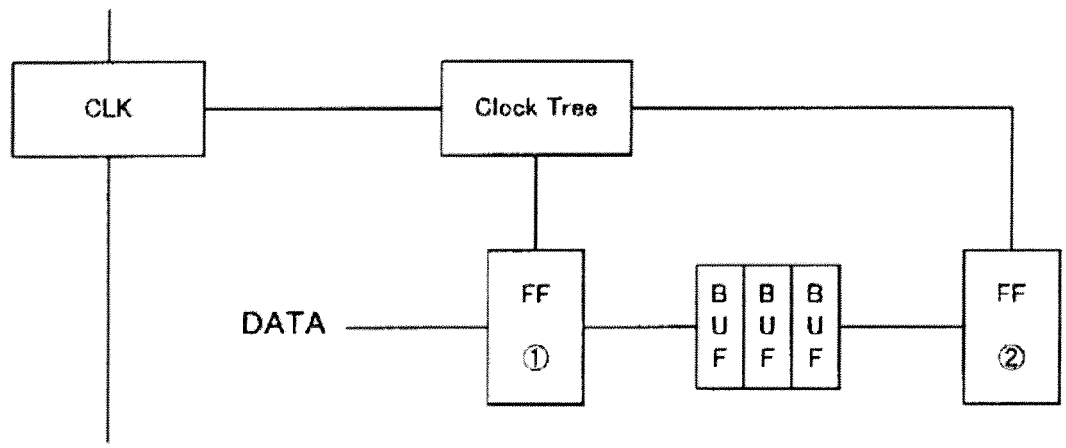
[FIG. 8] An explanatory diagram representing an example of buffer insertion.

Thus, a fall FF is inserted between two FFs and the same clock as that for the FFs on both ends is supplied to the fall FF to be inserted (see FIG. 6). This gives leading and trailing margins of a half of a clock cycle with respect to the clock supplied to the fall FF. Therefore, even when some offset is present between the arrival time of the clock at the FFs on both ends and that at the fall FF to be inserted, a delay equivalent to a half of a clock cycle can be inserted for an offset of the order of a half of a clock cycle (see FIG. 7).

It should be noted that in inserting a fall FF, a delay equivalent to a half of a clock cycle is inserted. Thus, there is a risk of a delay equal to or greater than the clock cycle generated between the flip-flops. In such a case, a buffer is inserted as needed (see FIG. 8).

The technique in the embodiment described above eliminates a failure factor in designing a semiconductor integrated circuit caused by too small a delay in propagation in which the arrival times of the clock at two the flip-flop circuits are taken into account, referred to as hold error. Yet, an increase of the area required is small. Moreover, the technique is simple.

The preceding description addresses an example in which the present technique is applied to a synchronous circuit by FF circuits in which a CLK (clock) signal is input to both FFs to serve as a set signal in the set/reset flip-flop circuit. However, it will be easily recognized that the present technique may be applied to an asynchronous circuit operated by recognizing input data by other circuits than CLK as a set signal. Moreover, when the phrase "position in the circuit arrangement" is used in this specification, it refers to a position in a schematic circuit arrangement and a physical position in layout.

Part or all of the aforementioned embodiment may be described as in the following Appendixes; however, the present invention is not limited thereto.

(Appendix 1) An apparatus for designing a semiconductor integrated circuit including flip-flop circuits, said apparatus comprising:

a timing analyzing section for detecting a hold error according to timing analysis data including values at input and output nodes of said flip-flop circuits, and identifying a node experiencing said hold error;

a fall FF/buffer insertion determining section for determining insertion of a fall FF or a buffer in said hold error position based on a result of the analysis by said timing analyzing section;

a fall FF inserting section for inserting a fall FF in said hold error position located to insert a fall FF based on fall FF insertion position data from said fall FF/buffer insertion determining section, and connecting a clock line to said inserted fall FF; and a buffer inserting section for inserting a buffer in said hold error position located to insert a buffer based on buffer insertion position data from said fall FF/buffer insertion determining section.

(Appendix 2) The semiconductor integrated circuit design apparatus as recited in Appendix 1, wherein said apparatus further comprises a database in which semiconductor integrated circuit design data is stored, said timing analyzing section is a section for detecting a hold error based on said semiconductor integrated circuit design data, and identifying a node experiencing said hold error, said fall FF inserting section is a section for inserting a fall FF in said hold error position based on said semiconductor integrated circuit design data and fall FF insertion position data from said fall FF/buffer insertion determining section, and connecting a clock line to said inserted fall FF, and said buffer inserting section is a section for inserting a buffer in said hold error position based on said semiconductor integrated circuit design data and buffer insertion position data from said fall FF/buffer insertion determining section.

(Appendix 3) The semiconductor integrated circuit design apparatus as recited in Appendix 1 or 2, wherein said fall FF/buffer insertion determining section is a section for determining which of a fall FF or a buffer to insert based on whether all hold error positions experience a setup error after inserting a delay equivalent to a half of a clock cycle.

(Appendix 4) A method of designing a semiconductor integrated circuit including flip-flop circuits in which a hold error is remedied, comprising:

an analyzing step at which a timing analyzing section detects a hold error based on semiconductor integrated circuit design data and identifies a node experiencing said hold error;

a fall FF/buffer insertion determining step at which a fall FF/buffer insertion determining section determines insertion of a fall FF or a buffer in said hold error position based on a result of the analysis by said timing analyzing step;

a fall FF inserting step at which a fall FF inserting section inserts a fall FF in said hold error position located to insert a fall FF based on fall FF insertion position data from said fall FF/buffer insertion determining step, and connects a clock line to said inserted fall FF; and a buffer inserting step at which a buffer inserting section inserts a buffer in said hold error position located to insert a buffer based on buffer insertion position data from said fall FF/buffer insertion determining step.

(Appendix 5) A program causing a computer to design a semiconductor integrated circuit including flip-flop circuits, said program causing said computer to function as:

a timing analyzing section for detecting a hold error according to timing analysis data including values at input and output nodes of said flip-flop circuits, and identifying a node experiencing said hold error;

a fall FF/buffer insertion determining section for determining insertion of a fall FF or a buffer in said hold error position based on a result of the analysis by said timing analyzing section;

a fall FF inserting section for inserting a fall FF in said hold error position located to insert a fall FF based on fall FF insertion position data from said fall FF/buffer insertion determining section, and connecting a clock line to said inserted fall FF; and a buffer inserting section for inserting a buffer in said hold error position located to insert a buffer based on buffer insertion position data from said fall FF/buffer insertion determining section.

The present application claims priority based on Japanese Patent Application No. 2009-49916 filed on Mar. 3, 2009, the disclosure of which is incorporated herein in its entirety.

[Reference Signs List]

3 Central processing unit (CPU)
5 Program memory
102 Timing analyzing section
104 Fall FF/buffer insertion determining section
106 Fall FF inserting section
107 Buffer inserting section
7 Database memory
101 Semiconductor integrated circuit design database
103 Timing analysis database
105 Fall FF/buffer insertion position database
108 Hold-error-remedied semiconductor integrated circuit design database

The invention claimed is:

1. An apparatus for designing a semiconductor integrated circuit including flip-flop circuits, comprising:
 a processor and a program memory;
 a timing analyzing section, stored in the program memory, configured to detect a hold error according to timing analysis data including values at input and output nodes of said flip-flop circuits, and to identify a node experiencing said hold error;
 a fall flip-flop/buffer insertion determining section, stored in the program memory, configured to determine insertion of a fall flip-flop or a buffer in said hold error position based on a result of the analysis by said timing analyzing section;
 a fall flip-flop inserting section, stored in the program memory, configured to insert a fall flip-flop in said hold error position located to insert a fall flip-flop based on fall flip-flop insertion position data from said fall flip-flop/buffer insertion determining section, and to connect a clock line to said inserted fall flip-flop; and
 a buffer inserting section, stored in the program memory, configured to insert a buffer in said hold error position located to insert a buffer based on buffer insertion position data from said fall flip-flop/buffer insertion determining section.

2. An apparatus for designing a semiconductor integrated circuit according to claim 1, wherein said apparatus further comprises a database, stored in a database memory, in which semiconductor integrated circuit design data is stored,
 said timing analyzing section is a section configured to detect a hold error based on said semiconductor integrated circuit design data, and to identify a node experiencing said hold error,
 said fall flip-flop inserting section is a section configured to insert a fall flip-flop in said hold error position based on said semiconductor integrated circuit design data and fall flip-flop insertion position data from said fall flip-flop/buffer insertion determining section, and to connect a clock line to said inserted fall flip-flop , and
 said buffer inserting section is a section that configured to insert a buffer in said hold error position based on said semiconductor integrated circuit design data and buffer insertion position data from said fall flip-flop/buffer insertion determining section.

3. An apparatus for designing a semiconductor integrated circuit according to claim 1, wherein said fall flip-flop/buffer insertion determining section is a section configured to determine which of a fall flip-flop or a buffer to insert based on whether all hold error positions experience a setup error after inserting a delay equivalent to a half of a clock cycle.

4. A method of designing a semiconductor integrated circuit including flip-flop circuits in which a hold error is remedied, comprising:
 an analyzing step at which a timing analyzing section detects, by using a computer, a hold error based on semiconductor integrated circuit design data and identifies a node experiencing said hold error;
 a fall flip-flop/buffer insertion determining step at which a fall flip-flop/buffer insertion determining section determines insertion of a fall flip-flop or a buffer in said hold error position based on a result of the analysis by said analyzing step;
 a fall flip-flop inserting step at which a fall flip-flop inserting section inserts a fall flip-flop in said hold error position located to insert a fall flip-flop based on fall flip-flop insertion position data from said fall flip-flop/buffer insertion determining step, and connects a clock line to said inserted fall flip-flop; and
 a buffer inserting step at which a buffer inserting section inserts a buffer in said hold error position located to insert a buffer based on buffer insertion position data from said fall flip-flop/buffer insertion determining step.

5. A non-transitory computer-readable storage medium storing a program causing a computer to design a semiconductor integrated circuit including flip-flop circuits, said program causing said computer to function as:
 a timing analyzing section configured to detect a hold error according to timing analysis data including values at input and output nodes of said flip-flop circuits, and to identify a node experiencing said hold error;
 a fall flip-flop/buffer insertion determining section configured to determine insertion of a fall flip-flop or a buffer in said hold error position based on a result of the analysis by said timing analyzing section;
 a fall flip-flop inserting section configured to insert a fall flip-flop in said hold error position located to insert a fall flip-flop based on fall flip-flop insertion position data from said fall flip-flop/buffer insertion determining section, and to connect a clock line to said inserted fall flip-flop ; and a buffer inserting section configured to insert a buffer in said hold error position located to insert a buffer based on buffer insertion position data from said fall flip-flop/buffer insertion determining section.

* * * * *